(12) United States Patent
Shin et al.

(10) Patent No.: US 11,932,326 B2
(45) Date of Patent: Mar. 19, 2024

(54) ELECTRIC POWER STEERING DEVICE AND METHOD

(71) Applicant: HL MANDO CORPORATION, Gyeonggi-do (KR)

(72) Inventors: Seong Woo Shin, Seoul (KR); Jong Hoon Lee, Incheon (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/629,405

(22) PCT Filed: Jul. 23, 2020

(86) PCT No.: PCT/KR2020/009726
§ 371 (c)(1),
(2) Date: Jan. 24, 2022

(87) PCT Pub. No.: WO2021/015574
PCT Pub. Date: Jan. 28, 2021

(65) Prior Publication Data
US 2022/0315098 A1   Oct. 6, 2022

(30) Foreign Application Priority Data

Jul. 24, 2019 (KR) .................. 10-2019-0089639

(51) Int. Cl.
*B62D 5/04* (2006.01)
*B62D 6/08* (2006.01)

(52) U.S. Cl.
CPC ......... *B62D 5/0484* (2013.01); *B62D 5/0487* (2013.01); *B62D 6/08* (2013.01)

(58) Field of Classification Search
CPC .......... B62D 5/00; B62D 5/005; B62D 5/006; B62D 5/0409; B62D 5/0457; B62D 5/046;
(Continued)

(56) References Cited

U.S. PATENT DOCUMENTS

2015/0066305 A1    3/2015   Kodera
2015/0303844 A1*  10/2015   Ajima ............... H02P 21/14
                                                       318/400.13
(Continued)

FOREIGN PATENT DOCUMENTS

CN        101795926        8/2010
CN        105501289        4/2016
(Continued)

OTHER PUBLICATIONS

International Search Report for PCT/KR2020/009726 dated Nov. 6, 2020 (now published as WO 2021/015574) with English translation provided by WIPO.
(Continued)

*Primary Examiner* — Russell Frejd
*Assistant Examiner* — Sara J Lewandroski
(74) *Attorney, Agent, or Firm* — Ladas & Parry, LLP

(57) ABSTRACT

An electric power steering device and method are disclosed. An electric power steering device according to an embodiment of the present invention comprises: a steering motor comprising a first winding and a second winding, each of Which receives applied three-phase power; a first control unit for controlling power supplied to the first winding; and a second control unit for controlling power supplied to the second winding, wherein, when one of a phase of the first winding and a phase of the second winding has failed to be opened, the control unit controlling the winding including the phase that has failed to be opened, among the first control unit and the second control unit, performs torque compensation control for additional output of compensation torque.

7 Claims, 6 Drawing Sheets

(58) Field of Classification Search
CPC .. B62D 5/0463; B62D 5/0466; B62D 5/0469; B62D 5/0472; B62D 5/0475; B62D 5/0481; B62D 5/0484; B62D 5/0487; B62D 6/00; B62D 6/008; B62D 6/08; B62D 6/10; B60W 50/0205; B60W 50/0225; B60W 50/023; B60W 50/029; B60W 2050/21; B60W 2050/022; B60W 2050/0292; B60W 20/50
See application file for complete search history.

(56) References Cited

U.S. PATENT DOCUMENTS

2017/0259846 A1* 9/2017 Koseki .................. H02P 29/68
2017/0297616 A1  10/2017 Kikuchi et al.

FOREIGN PATENT DOCUMENTS

| CN | 105790676 | 7/2016 |
|---|---|---|
| CN | 105835943 | 8/2016 |
| CN | 109463039 | 3/2019 |
| JP | 2013-236486 | 11/2013 |
| JP | 5610048 | 10/2014 |
| JP | 2016-086502 | 5/2016 |
| JP | 6156282 | 7/2017 |
| JP | 2017-210079 | 11/2017 |
| KR | 10-2016-0043244 | 4/2016 |
| KR | 10-2017-0024025 | 3/2017 |
| KR | 10-2017-0059107 | 5/2017 |
| KR | 10-1858180 | 6/2018 |
| KR | 10-1958120 | 7/2019 |

OTHER PUBLICATIONS

Written Opinion of the International Searching Authority for PCT/KR2020/009726 dated Nov. 6, 2020 (now published as WO 2021/015574) with English translation provided by Google Translate.
Office Action dated Dec. 13, 2023 for Chinese Patent Application No. 202080052818.1 and its English translation by Google Translate.

* cited by examiner

ELECTRIC POWER STEERING DEVICE AND METHOD

CROSS-REFERENCE TO RELATED APPLICATIONS

This application is the national stage of International Patent Application No. PCT/KR2020/009726 filed on Jul. 23, 2020, which claims under 35 U.S.C. § 119(a) the benefit of priority to Korean Patent Application No. 10-2019-0089639, filed on Jul. 24, 2019, which is hereby incorporated by reference for all purposes as if fully set forth herein. In addition, when this application claims priority in countries other than the U.S.A. on the same basis, the entire content of which is hereby incorporated by reference.

TECHNICAL FIELD

The present invention relates to an electric power steering device and method, and more particularly, to an electric power steering device and method capable of assisting or generating a steering force through a motor including a plurality of windings.

BACKGROUND ART

With the development of automobile technology, conventional mechanical and hydraulic steering systems are being replaced by electric power steering (EPS) systems using motors. In the EPS system, when a steering wheel rotates to generate torque, a motor driven by electric energy provides steering auxiliary power. According to the EPS system, a steering force of the steering wheel is appropriately changed through electronic control according to a driving speed of a vehicle to make the steering force light at a low speed and make the steering force heavy at a high speed, thereby contributing to stability in high-speed driving.

Meanwhile, with the introduction of advanced driver assistance systems and autonomous driving, there is a strong demand for securing safety in the event of a breakdown in addition to the performance of various electronic devices of a vehicle, which is also applied to an electric power steering system. Accordingly, a multiple winding-type motor is employed in the electric power steering system. For example, a dual winding-type motor, in which each of two windings is responsible for 50% of a total motor output, is used in the electric power steering system. In the dual winding-type motor, since each winding outputs 50% of the total output, even when a problem occurs in one winding, the other winding, which operates normally, outputs 50% of the total output to continuously provide driving force, thereby securing a certain level of safety.

However, when the output is maintained by only one winding in the dual winding-type motor, the output is lowered as compared to a normal state, thereby increasing the steering burden of a driver. In particular, when a rotational speed of the motor increases, even counter electromotive force of the motor is generated, and thus the electric power steering system may not provide normal steering auxiliary power. Accordingly, there is a need for the development of a technique capable of solving such a problem.

PATENT DOCUMENTS

Korean Registered Patent No. 10-1858180

DISCLOSURE

Technical Problem

The present invention is directed to providing an electric power steering device and method capable of performing torque compensation so that degradation of output torque of a motor is minimized even when a one-phase open-circuit failure occurs in one winding in a motor including a plurality of windings.

Technical Solution

One aspect of the present invention provides an electric power steering device including a steering motor including a first winding and a second winding, each of which receives applied three-phase power, a first control unit configured to control power supplied to the first winding, and a second control unit configured to control power supplied to the second winding, wherein, when an open-circuit failure occurs in one of one phase of the first winding and one phase of the second winding, among the first control unit and the second control unit, the control unit that controls the winding having the one phase, in which the open-circuit failure has occurred, performs torque compensation control to additionally output compensation torque.

Each of the first control unit and the second control unit may control power on the basis of one or more pieces of information of an angular velocity and torque of a steering wheel.

The compensation torque may correspond to a reduced amount of output torque due to the one-phase open-circuit failure.

The torque compensation control may be performed in an entire rotational speed region of the steering motor.

The torque compensation control may be performed in a method of increasing a maximum torque in a section, in which torque may be generated, in the winding in which the one-phase open-circuit failure has occurred.

Another aspect of the present invention provides an electric power steering method, including an open-circuit failure detection operation of detecting an open-circuit failure occurring in one of one phase of a first winding and one phase of a second winding in a steering motor including the first winding and the second winding, each of which three-phase power is applied, and a torque compensation control operation of performing torque compensation control so that the winding having one phase in which the open-circuit failure has occurred further outputs compensation torque.

In the torque compensation control operation, the compensation torque may correspond to a reduced amount of output torque due to the one-phase open-circuit failure.

The torque compensation control operation may be performed in an entire rotational speed region of the steering motor.

In the torque compensation control operation, the torque compensation control may be performed in a method of increasing a maximum torque in a section, in which torque may be generated, in the winding in which the one-phase open-circuit failure has occurred.

Advantageous Effects

According to embodiments of the present invention, even when a one-phase open-circuit failure occurs in one winding in a motor including a plurality of windings, torque compensation control can be performed by a control unit corresponding to the corresponding winding, thereby minimizing the degradation of output torque.

MODES OF THE INVENTION

Figure 1:
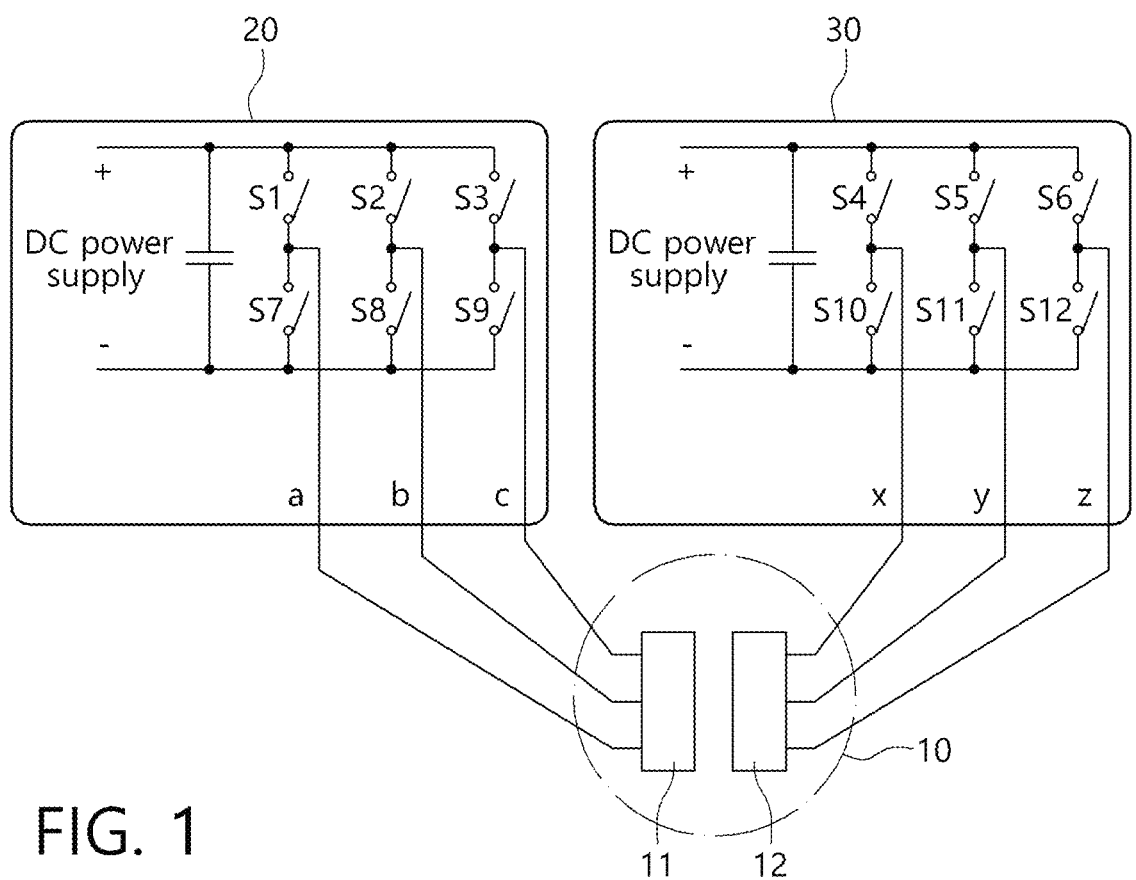
FIG. 1 is a configuration diagram of an electric power steering device according to one embodiment of the present invention.

Hereinafter, embodiments of the present invention will be described in detail with reference to the accompanying drawings so that those of ordinary skill in the art can easily implement them. The present invention may be implemented in several different forms and is not limited to the embodiments that will be described below. In the drawings, for clarity, irrelevant portions to descriptions are omitted, and the same reference numerals throughout the specification are used for the same or similar components or elements.

In the present specification, it will be further understood that the terms "comprise," "comprising," "include," and/or "including" when used in this specification, specify the presence of stated features, integers, steps, operations, elements, components and/or groups thereof, but do not preclude the presence or addition of one or more other features, integers, steps, operations, elements, components and/or groups thereof.

FIG. 1 is a configuration diagram of an electric power steering device according to one embodiment of the present invention.

The electric power steering device according to one embodiment of the present invention includes a steering motor 10 including a plurality of windings and is configured to perform torque compensation control so that the degradation of output torque may be minimized even when a one-phase open-circuit failure occurs in one of the plurality of windings of the steering motor 10.

Referring to FIG. 1, the electric power steering device according to one embodiment of the present invention includes the steering motor 10, a first control unit 20, and a second control unit 30.

The steering motor 10 includes a first winding 11 and a second winding 12, each of which receives applied three-phase power. That is, the steering motor 10 is composed of a dual-winding motor. More specifically, the steering motor 10 may be a three-phase dual winding alternating current (AC) motor.

In one embodiment of the present invention, the steering motor 10 is for assisting steering force of a driver and may generate steering assist force on the basis of one or more of an angular velocity and torque of a steering wheel. Of course, according to one embodiment of the present invention, the steering motor 10 is not limited to assisting the steering force, and in another embodiment of the present invention, the steering motor 10 may be a motor applied to a steer-by-wire.

In one embodiment of the present invention, the steering motor 10 is controlled by being divided into two windings of the first winding 11 and the second winding 12, and three-phase power is applied to the steering motor 10 through each winding. In addition, the steering motor 10 is configured such that each of the first winding and the second winding outputs 50% of a total output.

In one embodiment of the present invention, the supply of power to the first winding 11 is controlled by the first control unit 20, and in FIG. 1, the three phases supplied to the first winding 11 are expressed as a, b, and c. In addition, the supply of power to the second winding 12 is controlled by the second control unit 30, and in FIG. 1, the three phases supplied to the second winding 12 are expressed as x, y, and z.

The first control unit 20 controls the power supplied to the first winding 11. In addition, the second control unit 30 controls the power supplied to the second winding 12. At this point, the first control unit 20 and the second control unit 30 may each control the power on the basis of one or more pieces of information of the angular velocity and torque of the steering wheel of the vehicle.

Each of the first control unit 20 and the second control unit 30 may receive a direct-current (DC) voltage from a DC power supply, convert the DC voltage into an AC voltage for driving the steering motor 10, and control an operation of the steering motor 10 by an on/off operation of each of multiple semiconductor switch elements Si to S12 included therein.

The first control unit 20 and the second control unit 30 may be directly connected to the steering motor 10 and may be indirectly connected through a separate configuration such as a circuit unit configured to protect the steering motor 10. In addition, the first control unit 20 and the second control unit 30 may refer to a main control unit (MCU), an electronic control unit (ECU), or a central processing unit (CPU) of a vehicle, or may refer to some functions of the MCU or the CPU.

Figure 2:
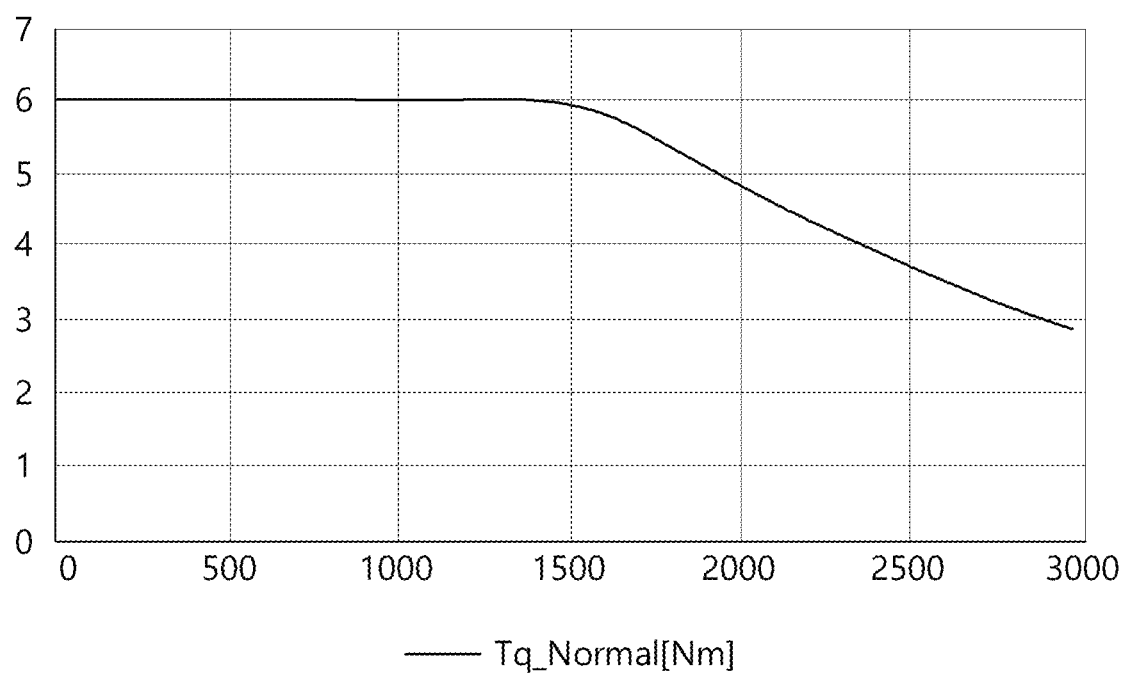
FIG. 2 is a diagram illustrating output torque of a steering motor when an electric power steering device according to one embodiment of the present invention is in a normal state.

FIG. 2 illustrates output torque Tq Normal of the steering motor 10 when the electric power steering device according to one embodiment of the present invention is in a normal state.

Referring to FIG. 2, the steering motor 10 of the electric power steering device according to one embodiment of the present invention outputs a torque of 6 Nm in a low-speed rotation region. As described above, since each of the first winding 11 and the second winding 12, which are respectively controlled by the first control unit 20 and the second control unit 30 of the steering motor 10, outputs 50% of the total output, the output torque of 6 Nm indicates that each of the first winding 11 and the second winding 12 outputs a torque of 3 Nm in the low-speed rotation region.

Meanwhile, in FIG. 2, it can be seen that when a rotational speed of the steering motor 30 is increased, the torque starts to decrease with respect to a critical rotational speed due to a counter electromotive force of the steering motor 30.

Figure 3:
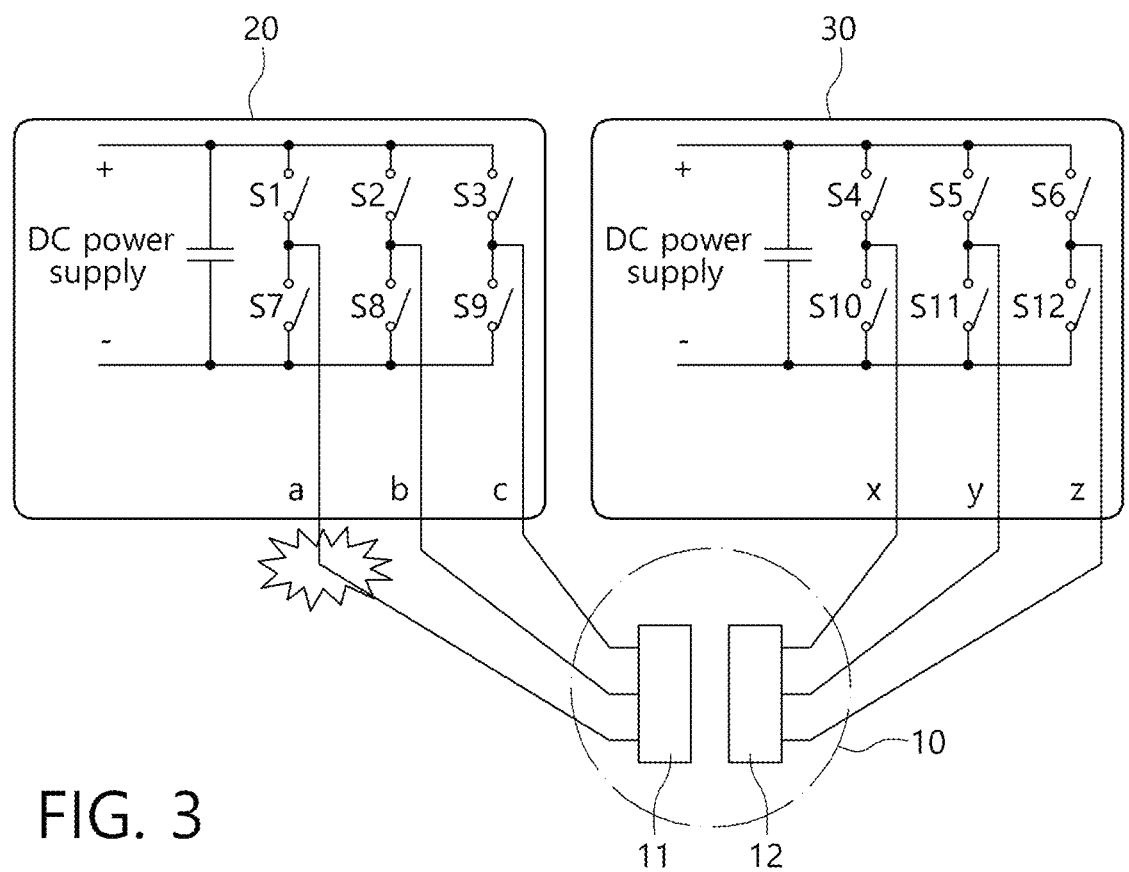
FIG. 3 is a diagram illustrating a state in which a one-phase open-circuit failure occurs in one winding in the electric power steering device according to one embodiment of the present invention.
Figure 4:
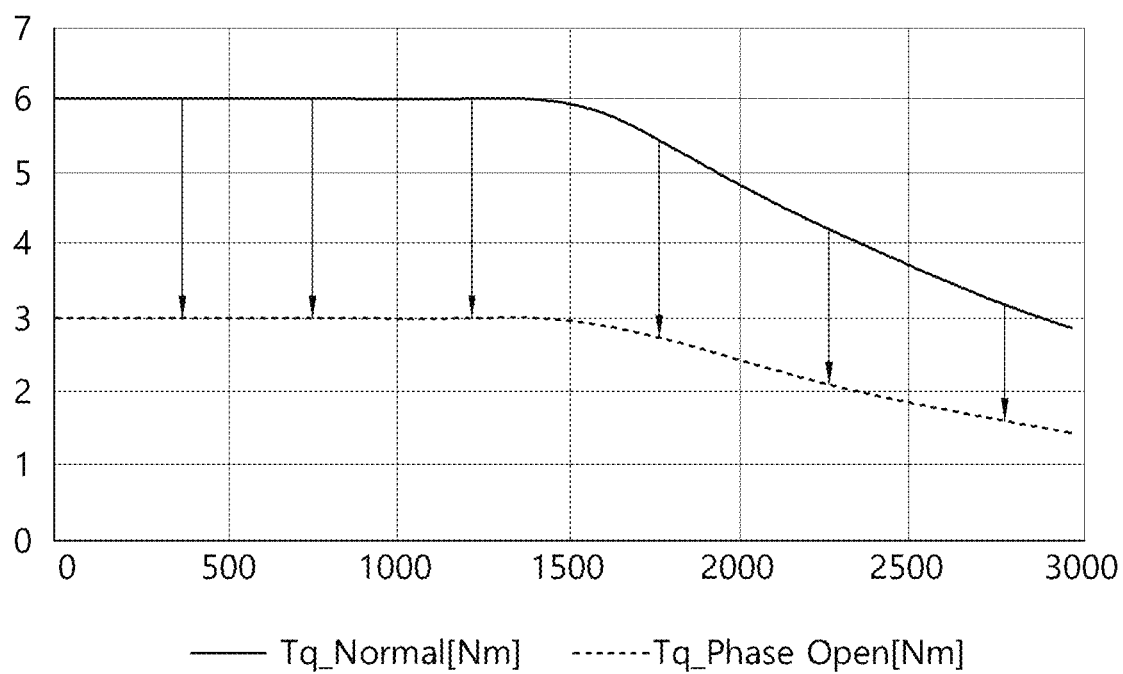
FIG. 4 is a diagram illustrating output torque of the steering motor when a one-phase open-circuit failure occurs in one of dual windings of the steering motor and only the normal winding is used without using the corresponding winding.

FIG. 3 illustrates a state in which a one-phase open-circuit failure occurs in one winding in the electric power steering device according to one embodiment of the present invention, and FIG. 4 illustrates output torque of the steering motor when a one-phase open-circuit failure occurs in one of the dual windings of the steering motor and only the normal winding is used without using the corresponding winding.

Referring to FIGS. 3 and 4, it can be seen that when a one-phase open-circuit failure occurs in the first winding 11, as in a case in which one coil corresponding to part "a" in a lower portion of FIG. 3 is open, in the steering motor 10 having dual windings, and when the first winding 11 is not used and only the second winding 12 in a normal state is used, output torque Tq_Phase Open is reduced to 50%. In other words, the steering device operates at 50% of the total output by adding 50% of the output through the normal second winding 12 and 0% of the output through the first winding 11 in which the failure has occurred.

Thus, when a one-phase open-circuit failure occurs in one winding in the steering motor having dual windings and only the normal winding is used without using the corresponding winding, the steering assist force is reduced by 50%, and the driver of the vehicle experiences difficulty in steering according to the reduction of the steering assist force. In particular, when the rotational speed of the steering motor 10 exceeds the critical rotational speed, the steering assist force is further reduced due to the counter electromotive force, and driver fatigue in the steering is inevitably increased.

In order to solve this problem, in one embodiment of the present invention, when an open-circuit failure occurs in one of one phase of the first winding 11 and one phase of the second winding 12, among the first control unit 20 and the second control unit 30, the control unit that controls the winding having one phase, in which the open-circuit failure occurs, performs torque compensation control to additionally output compensation torque.

Here, whether an open-circuit failure occurs in each of the plurality of coils included in the first winding 11 and the second winding 12 may be detected by a detection unit (not shown). The detection unit may detect whether an open-circuit failure occurs in each of the plurality of coils included in the first winding 11 and the second winding 12 included in the steering motor 10 by using a driver. The detection unit may be separately provided from the first control unit 20 and the second control unit 30 or may be configured by being included in the first control unit 20 and the second control unit 30.

Further, the torque compensation control may be performed in an entire rotational speed region of the steering motor 10. Furthermore, the compensation torque may correspond to a reduced amount of the output torque due to the one-phase open-circuit failure.

Meanwhile, in one embodiment of the present invention, the torque compensation control may be performed in a method of increasing the maximum torque in a section, in which torque may be generated, in the winding in which the one-phase open-circuit failure has occurred. Torque is also generated in the winding in which the one-phase open-circuit failure occurs. However, in this case, depending on a position of a rotor of the steering motor 10, there is a section in which torque is not generated. For this reason, conventionally, when a one-phase open-circuit failure occurs, generally, the corresponding winding is not used. However, since there is a section, in which torque may be generated, even in the winding in which a one-phase open-circuit failure occurs, when performing the control in a method of continuously controlling the winding in which the one-phase open-circuit failure has occurred but increasing the maximum torque in the section in which torque may be generated, output torque may be appropriately compensated for.

Of course, in addition to the above-described method, the torque compensation control may be performed in various methods. Accordingly, the torque compensation control method is not limited by the above description related to one embodiment of the present invention.

Figure 5:
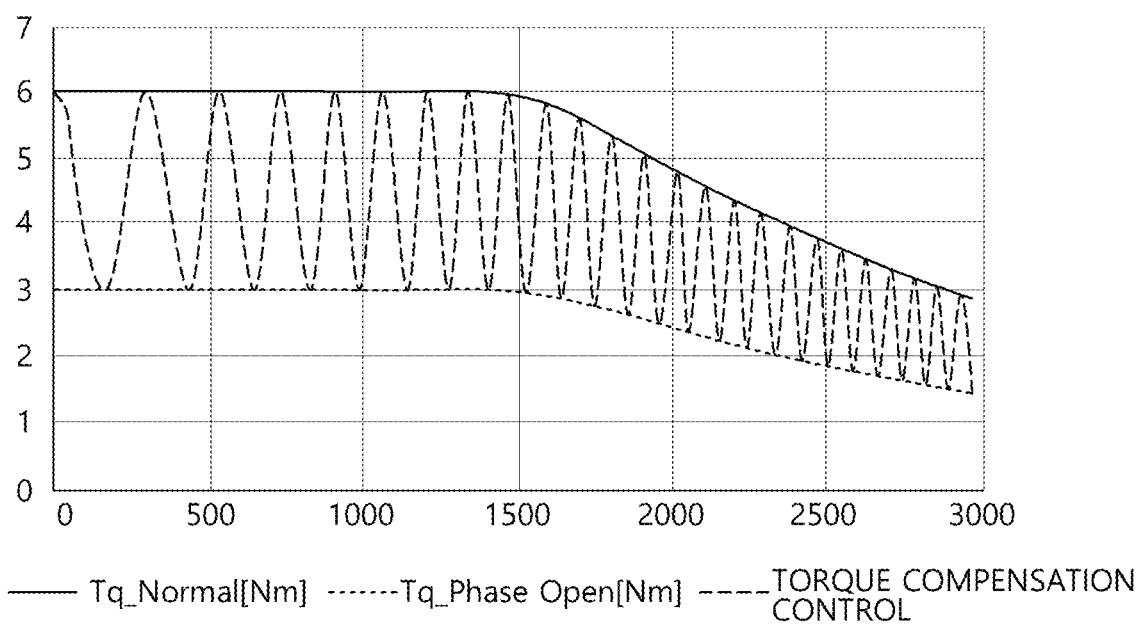
FIG. 5 is a diagram illustrating output torque of the steering motor when torque compensation control is performed in the electric power steering device according to one embodiment of the present invention.

FIG. 5 illustrates output torque of the steering motor when the torque compensation control is performed in the electric power steering device according to one embodiment of the present invention.

Referring to FIG. 5, the result of the torque compensation control, which generates compensation torque Tq_Torque Compensation Control corresponding to the reduced amount of the output torque due to the one-phase open-circuit failure in order to follow the output torque Tq Normal when both the first winding 11 and the second winding 12 of the steering motor 10 are normal, can be seen. As described above, according to one embodiment of the present invention, it is possible to obtain output torque that is obtained by adding the compensation torque Tq_Torque Compensation Control generated according to the torque compensation control to the output torque Tq_Phase Open in the case of using only the winding in the normal state without using the winding in which the one-phase open-circuit failure has occurred.

In FIG. 5, it can be seen that the torque compensation control is performed in the entire rotational speed region of the steering motor 10. With such a control, when an open-circuit failure occurs in one of the dual windings included in the steering motor 10, it is possible to obtain compensation torque not only when the rotational speed of the steering motor 10 exceeds the critical rotational speed and the counter electromotive force is generated but also when the rotational speed of the steering motor 30 is low. Accordingly, in an entire rotational speed section of the steering motor 10, the driver may be provided with the same steering feeling as the case in which all the windings are normal.

Figure 6:
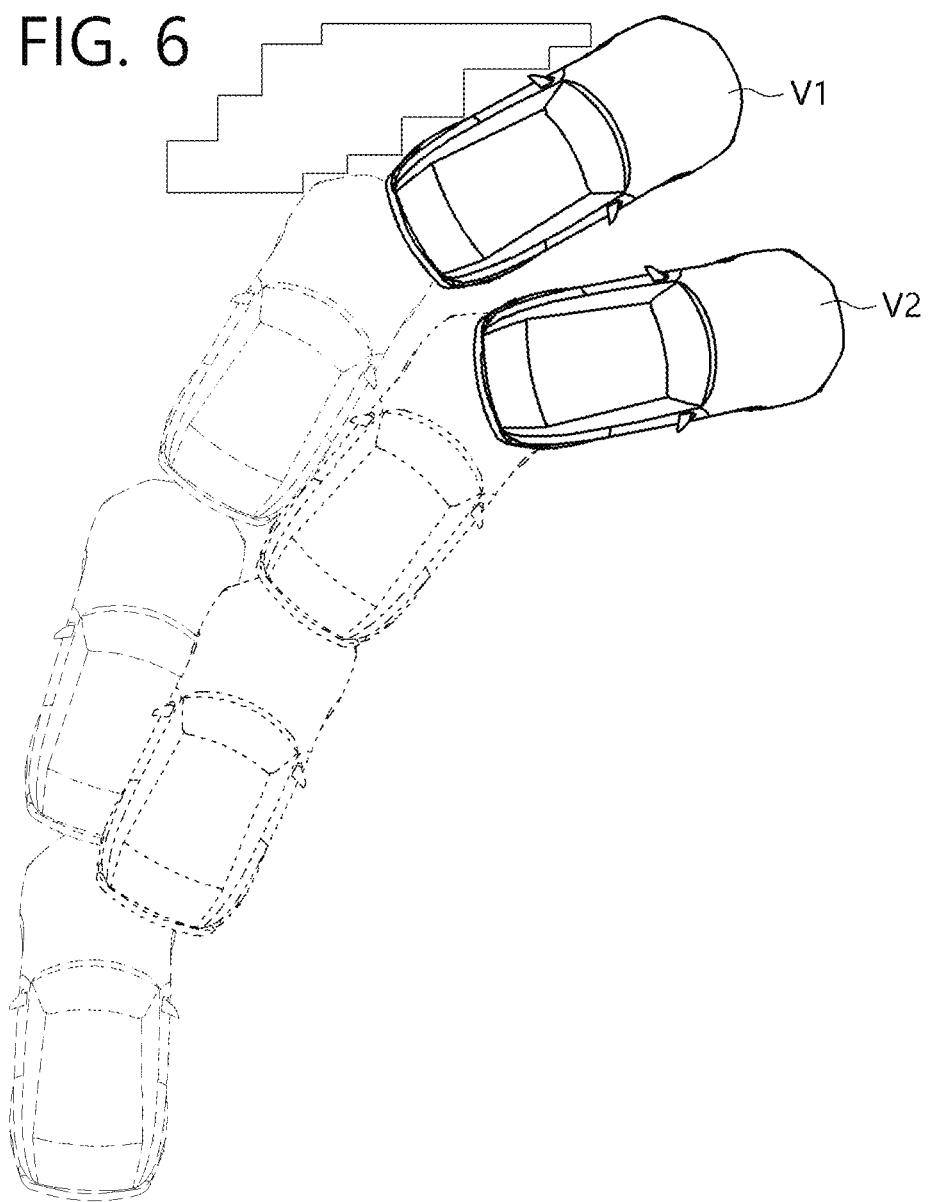
FIG. 6 is a view for describing a difference between steering assist forces according to the presence or absence of the torque compensation control.

FIG. 6 is a view for describing a difference between steering assist forces according to the presence or absence of the torque compensation control.

In FIG. 6, vehicles V1 and V2 are each provided with the electric power steering system in which steering assist force is provided by the steering motor 10 including dual windings. In this case, it is assumed that an open-circuit failure occurs in one of the dual windings included in the steering motor 10 and a driver operates a steering wheel with a predetermined force. With this assumption, it can be seen that the vehicle V2, in which the torque compensation control is performed according to one embodiment of the present invention, may be provided with a greater steering assist force than the vehicle V1, in which the winding in which a one-phase open-circuit failure has occurred is not used and only the winding in the normal state is used, and may stably avoid obstacles.

Figure 7:
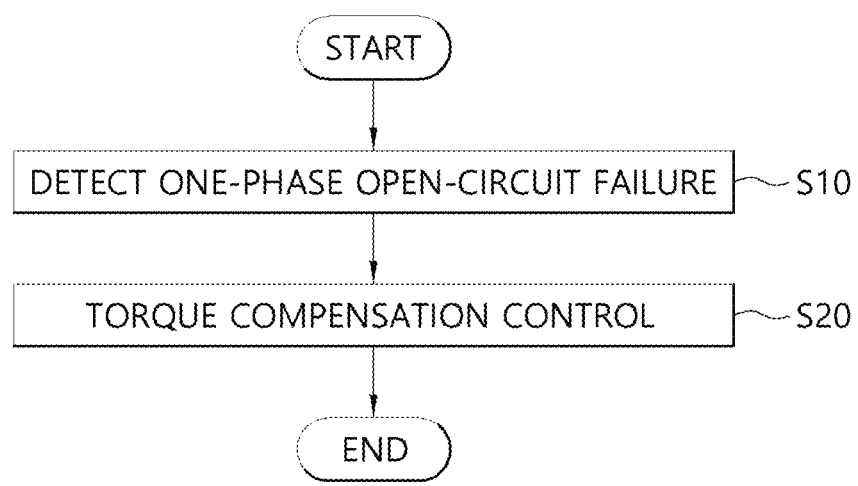
FIG. 7 is a flowchart of an electric power steering method according to one embodiment of the present invention.

FIG. 7 is a flowchart of an electric power steering method according to one embodiment of the present invention.

The electric power steering method according to one embodiment of the present invention compensates for output torque of a steering motor so that the degradation of the output torque may be minimized even when a one-phase open-circuit failure occurs in one of a plurality of windings of the steering motor.

In addition, the electric power steering method according to one embodiment of the present invention may be performed by the electric power steering device according to one embodiment of the present invention. In the electric power steering method according to one embodiment of the present invention, a steering motor 10 may include a first winding 11 and a second winding 12, each of which receives applied three-phase power. More specifically, the steering motor 10 may be a three-phase dual winding AC motor.

Referring to FIG. 7, the electric power steering method according to one embodiment of the present invention includes an open-circuit failure detection operation S10 and a torque compensation control operation S20.

The open-circuit failure detection operation S10 is an operation of detecting an open-circuit failure occurring in one of one phase of the first winding 11 and one phase of the second winding 12 in the steering motor 10 including the first winding 11 and the second winding 12, each of which receives applied three-phase power. At this point, the supply of power to the first winding 11 may be controlled by a first control unit 20, and the supply of power to the second winding 12 may be controlled by a second control unit 30.

In the open-circuit failure detection operation S10, whether an open-circuit failure occurs on each of the plurality of coils included in the first winding 11 and the second winding 12 may be detected by a detection unit (not shown). As described above, the detection unit may be provided separately from the first control unit 20 and the second control unit 30 or may be included in the first control unit 20 and the second control unit 30 as a configuration thereof.

The torque compensation control operation S20 is an operation of performing torque compensation control so that the winding having one phase in which the open-circuit failure has occurred further outputs compensation torque. Here, the compensation torque may correspond to a reduced amount of the output torque due to the one-phase open-circuit failure.

In addition, in the torque compensation control operation S20, the torque compensation control may be performed in an entire rotational speed region of the steering motor 10. With such a control, when an open-circuit failure occurs in one of the dual windings included in the steering motor 10, it is possible to obtain the compensation torque not only when a rotational speed of the steering motor 10 exceeds a critical rotational speed and a counter electromotive force is generated but also when the rotational speed of the steering motor 10 is low. Accordingly, in an entire rotational speed section of the steering motor 10, a driver may be provided with the same steering feeling as the case in which all the windings are normal.

Further, in the torque compensation control operation S20, the torque compensation control may be performed in a method of increasing the maximum torque in a section, in which torque may be generated, in the winding in which the one-phase open-circuit failure has occurred. As described above, since there is a section, in which torque may be generated, even in the winding in which one-phase open-circuit failure occurs, when performing the control in a method of continuously controlling the winding in which the one-phase open-circuit failure has occurred but increasing the maximum torque in the section in which torque may be generated, the output torque may be appropriately compensated for.

The embodiments of the present invention have been described. However, it should be noted that the spirit of the present invention is not limited to the embodiments in the specification and those skilled in the art and understanding the present invention may easily suggest other embodiments by addition, modification, and removal of the components within the same spirit, but those are construed as being included in the spirit of the present invention.

The invention claimed is:

1. An electric power steering device comprising:
a steering motor including a first winding and a second winding, each of which receives applied three-phase power;
a first control unit configured to control power supplied to the first winding; and
a second control unit configured to control power supplied to the second winding,
wherein, when an open-circuit failure occurs in one of one phase of the first winding and one phase of the second winding, among the first control unit and the second control unit, the control unit that controls the winding having the one phase, in which the open-circuit failure has occurred, performs torque compensation control increasing a maximum torque in a section, in which torque is generated, in the winding in which the one-phase open-circuit failure has occurred to additionally output compensation torque.

2. The electric power steering device of claim 1, wherein each of the first control unit and the second control unit controls power on the basis of one or more pieces of information of an angular velocity and torque of a steering wheel.

3. The electric power steering device of claim 1, wherein the compensation torque corresponds to a reduced amount of output torque due to the one-phase open-circuit failure.

4. The electric power steering device of claim 1, wherein the torque compensation control is performed in an entire rotational speed region of the steering motor.

5. An electric power steering method, comprising:
detecting an open-circuit failure occurring in one of one phase of a first winding and one phase of a second winding in a steering motor including the first winding and the second winding, each of which three-phase power is applied; and
performing torque compensation control increasing a maximum torque in a section, in which torque is generated, in the winding in which the one-phase open-circuit failure has occurred so that the winding having the one phase in which the open-circuit failure has occurred further outputs compensation torque.

6. The electric power steering method of claim 5, wherein the torque compensation control is performed in an entire rotational speed region of the steering motor.

7. The electric power steering method of claim 5, wherein the compensation torque corresponds to a reduced amount of output torque due to the one-phase open-circuit failure.

* * * * *